May 26, 1959
D. L. POMMER
2,887,839
GRASS CATCHER
Filed May 11, 1956
2 Sheets-Sheet 1
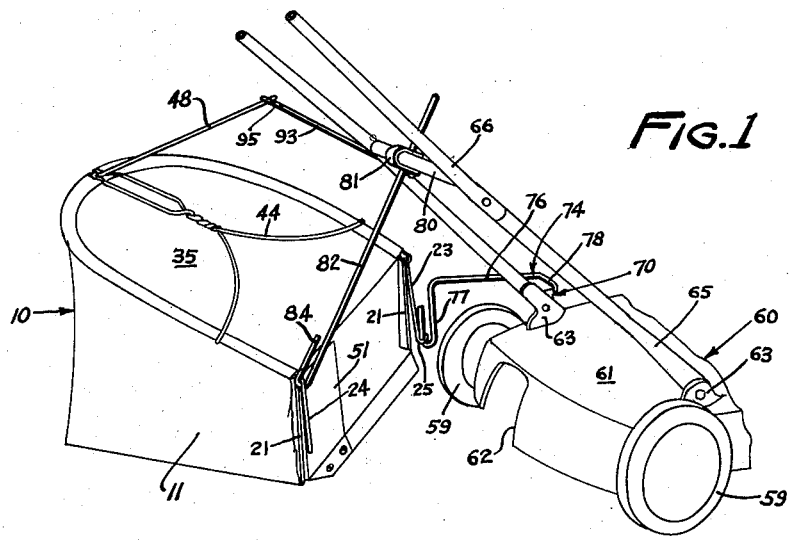
FIG.1
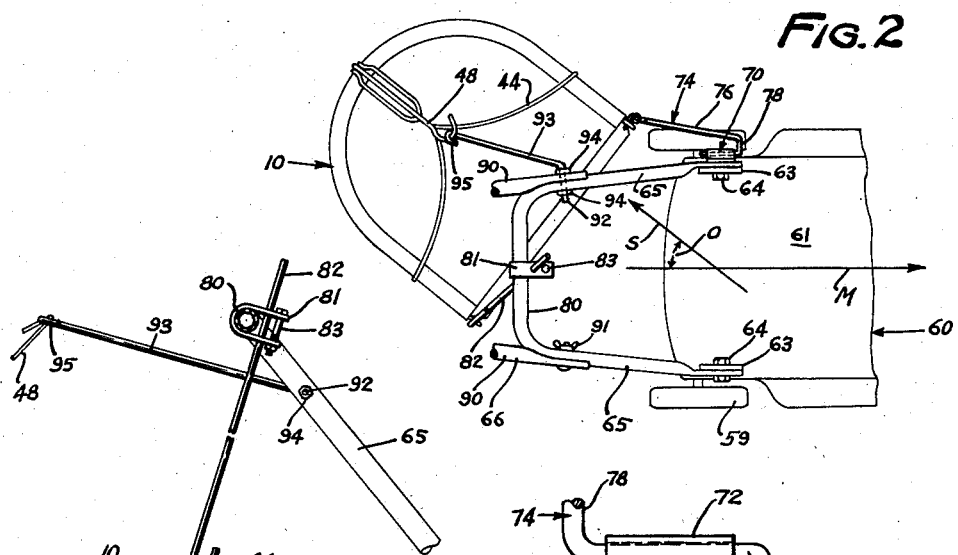
FIG.2
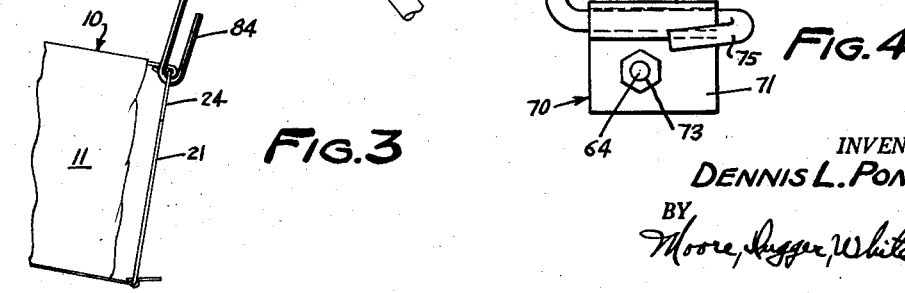
FIG.3
FIG.4
INVENTOR.
DENNIS L. POMMER
BY
Moore, Rigger, White & Bard
ATTORNEYS May 26, 1959 D. L. POMMER 2,887,839
GRASS CATCHER
Filed May 11, 1956 2 Sheets-Sheet 2

INVENTOR.
DENNIS L. POMMER
BY
ATTORNEYS

United States Patent Office 2,887,839
Patented May 26, 1959

2,887,839

GRASS CATCHER

Dennis L. Pommer, St. Paul, Minn., assignor to Foley Manufacturing Company, Minneapolis, Minn., a corporation of Minnesota Application May 11, 1956, Serial No. 584,285

2 Claims. (Cl. 56—202)

This invention relates to new and useful improvements in catchers for collecting and retaining clippings discharged from mowing machines, and more particularly relates to new and useful improvements in grass catchers for power operated rotary mowers.

While grass catchers have commonly been used with reel type mowers, being connected to the supporting framework at either side of the reel and having a suspension bracket attached to the single handle of the reel mower for supporting the rear of the catcher, there have been difficulties in providing grass catchers which are readily utilizable with rotary mowers. These difficulties have comprised, among others, difficulty in supporting and retaining the grass catcher in proper position, difficulty in retaining the clippings discharged from the rotary mower while permitting escape of the relatively rapid stream of air, difficulty in supporting and positioning the catcher of the mower where the discharge from the rotary mower housing is at an angle to the normal direction of movement of the mower.

Broadly speaking, this invention comprises a grass catcher providing a basket into which clippings are adapted to be directed and retained while the air stream in which they are carried is permitted to escape. The basket is provided with an asymmetrical forward opening or mouth and baffle means defining the asymmetrical opening. The catcher is also provided with a top cover screen for retaining the clippings while permitting the escape of air. The basket is novelly supported from the mower at an angle with reference to the normal direction of movement of the mower, with one corner secured to the mower frame and the other corner supported by the mower handle together with the rear portion of the basket.

It is therefore an object of this invention to provide a new and useful clippings retainer for a lawn mower;

A further object of this invention is to provide a new and useful clippings retainer for a rotary lawn mower having provision for guiding a stream of clippings into the retainer and retaining the clippings while permitting escape of the air stream;

A further object of this invention is to provide new and useful supporting structure for positioning a clippings retainer to a lawn mower;

A further object of the invention resides in the specific structural details of the retainer or grass catcher including the top cover screen, the baffle means providing the asymmetrical opening and in the structural details of the supporting means for the retainer including the bracket structure for supporting one forward corner of the retainer from and adjacent the mower frame, bracket structure for supporting the other forward corner of the retainer from the mower handle and bracket structure for supporting the back of the catcher from the mower handle;

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the several figures of the drawings in which corresponding numerals refer to the same parts and in which:

Figure 1 is a fragmentary isometric view of a rotary mower including the grass catcher of the instant invention;

Figure 2 is a fragmentary top plan view in reduced scale of the structure of Figure 1;

Figure 3 is an enlarged fragmentary elevational view partially in section, showing the supporting bracket structure for one corner in the back of the catcher;

Figure 4 is an enlarged detailed elevational view of a bracket mounting plate of this invention;

Figure 5:
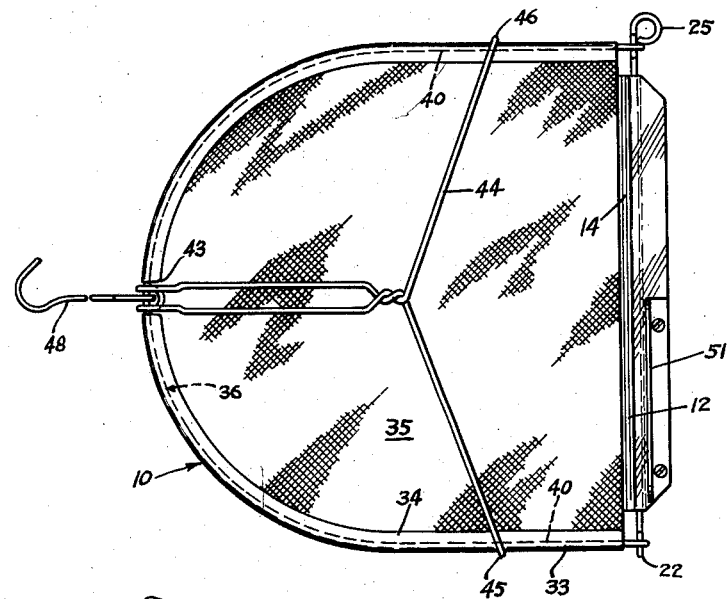
Figure 5 is an enlarged top plan view of the basket of the instant invention.

Reference now to the drawings and particularly to Figure 1, will show the following:

The grass catcher generally designated 10 comprises a basket 11 and supporting bracketry. The basket 11 is perhaps shown best at Figures 5–7, and comprises a flat rigid generally semi-circular bottom 12 of sheet metal or other like material providing a linear leading edge, and perpendicular side edges joined to a rounded trailing edge. Bottom 12 is provided with a peripheral upwardly turned flange 13 crimped at the side and trailing edges around the bottom edge of a canvas or similar wall which is coextensive with the side and trailing edges of bottom 12 and forms a vertical retaining member for the basket 11. The peripheral flange 13 is also crimped adjacent its front or leading edge to provide a sleeve 14 for a transverse portion 16 of bracket 15 as seen best in Figure 7. Bracket 15 comprises the tranverse or horizontal portion 16 enclosed by the sleeve 14 and is joined by bent portions 20 at either side thereof to risers 21, one of risers 21 is in turn joined by bent portion 22 to portion 23 and one to portion 24. Portion 23 comprises a downwardly extending portion somewhat parallel but slightly diverging its respective portion 22 (Figure 7) and terminates in a horizontal hook loop 25. This is at the right corner of basket 11 with reference to Figure 7. Portion 24 is substantially identical to portion 23 but truncated or severed at 26. This is at the left corner of basket 11 with reference to Figure 7. The wall portion 11 is inclined at either side of the basket from leading edge 30 to trailing edge 31 as shown best in Figure 6. The top edge 32 of the canvas wall is sewed together to provide a loop 33 having an adjacent inwardly directed flange 34 to which flange 34 is secured the screen 35, by sewing or otherwise, and has a linear leading edge 36 substantially in the same vertical plane as leading edges 30 for side walls 11.

Figure 6:
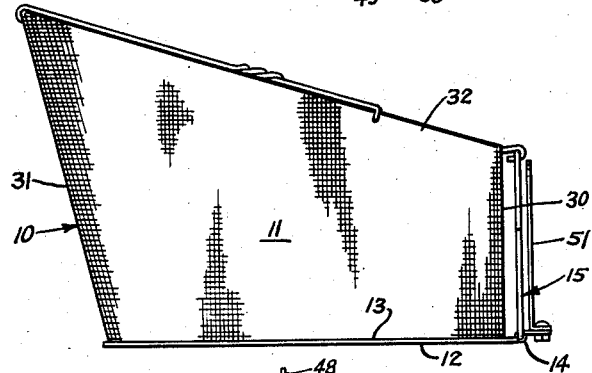
Figure 6 is a side elevational view of the basket of Figure 5.

The loop 33 and flange 34 are interrupted at the trailing edge of the basket to provide a gap 43 as shown in Figure 5. An arcuate member 37 having parallel spaced hook ends 40 in the form of a wire or cable is positioned in the loop 33 and extends through the spaced gap 43 in loop 33 and flange 34. A top or stiffening frame 44 of wire has a portion secured to member 36 at 45, a similar portion secured to member 36 at 46 and parallel prolongations secured thereto at gap 43.

The frame 44 is crimped or clamped to the rod 36 to be immobilized with respect thereto.

The hook member 48 has one end looped around wire 36 and the other end for support as subsequently explained.

Figure 7:
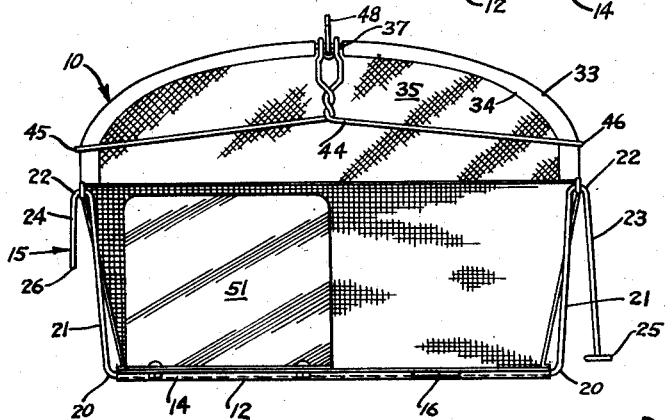
Figure 7 is an end elevational view of the basket of Figures 5 and 6.

Leading edge 14 of the bottom has secured thereto a baffle plate 51 covering the leftward position of the entrance to the basket 10 as shown in Figure 7.

The mower 60 to which this catcher is to be secured is provided with a housing 61 having an asymetrically positioned aperture 62 therein, from which aperture the clippings are discharged in a stream. It is supported from rear wheels 59 and is provided with spaced upwardly extending lugs 63. To lugs 63 by bolts 64 are secured the spaced ends of a first U-shaped handle member 65 to which in turn are secured the spaced ends of a second U-shaped handle member 66 . The top bolt 64 (Figure 2) has been removed and the flat bracket mounting plate member 71 of bracket 70 is positioned in abutment with the flattened end of handle portion 65 as shown in Figure 2. Plate 70 is provided with a sleeve 72 and an aperture 73 through which bolt 64 is repositioned. Journalled for rotary movement within sleeve 72 is a bracket 74 having a turned end 75 for engaging the outer surface of plate 71 for retaining bracket 74 in the position of Figures 1 and 2 as shown best in Figure 4. Bracket 74 is provided with an outwardly extending portion 78 (upwardly with reference to Figure 2) and an angle portion 76 terminating in an elongated upended hook 77, as shown in Figure 1.

Hook 77 is engaged with the loop member 25 and serves to support the top corner of the basket 10 with reference to Figure 2 or right corner with reference to Figure 7.

The horizontal base portion 80 of member 65 has secured thereto a U-clamp 81 at substantially the center thereof, the arms of clamp 81 being provided with aligned apertures in which rod 82 may be positioned. U-clamp 81 is provided with a bolt assembly 83 through the ends of the arms thereof for clamping it securely to member 80 and for retaining the end of rod 82 in the aligned apertures as shown best in Figure 3. The end of rod 82 is provided with an upturned hook 84 which serves to engage the loop between portions 21 and 24 at the left side of the basket when viewed in Figure 7. Thus, rod 82 serves to support the bottom corner of the basket with reference to Figure 2.

The spaced ends 90 of handle member 66 are usually supported from member 65 by wing nut assemblies 91, one of which is shown in Figure 2. One of the wing nut assemblies 91 has been removed and replaced by a turned threaded end 92 of bracket 93, which is secured thereto by nuts 94. Thus, one of the spaced ends 90 of member 66 (the upper spaced end with reference to Figure 2) is secured to member 65 by the threaded end 92 of member 93 being passed through the aligned apertures therein and secured thereto by nuts 94. Member 93 is provided with a hook end 95 which serves to engage the turned end of hook 48 as shown in Figures 2 and 3 for supporting the back of basket 11.

Thus, there is provided a grass catcher having a planar bottom, a vertical peripheral wall providing a closed back and a forwardly directed opening, the vertical peripheral wall secured to a top screen member, and the bottom being provided with an integral asymmetrically positioned baffle enclosing part of the forwardly directed opening. Means is provided for supporting one corner of the grass catcher basket from a transverse handle member and supporting the other corner of the basket from a mower frame. Means is also provided for supporting the rear of the basket from the handle of the mower.

As exemplified, the basket is positioned so that leading edge 14 is perpendicular to the direction of the discharged stream of cuttings S, which stream is at an acute angle O with reference to the normal direction of movement M of the mower. Angle O is preferably between zero and 45°.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A rotary mower having a housing providing a trailing edge having an asymmetrical opening positioned therein through which a stream of clippings is adapted to be discharged at an angle inclined with reference to the normal direction of motion of the mower, said housing being provided with a pair of spaced upwardly directed lugs, a handle comprising a first U member having spaced ends secured to said upwardly directed lugs, a second U member having spaced ends secured to the base of said first U member, a plate member secured to one of said spaced ends of said first U member and to one of said lugs and providing a sleeve, a rod member positioned in said sleeve and connected to a grass catcher, said grass catcher comprising a planar bottom providing a forwardly directed linear edge, a side wall secured to this bottom and providing a pair of spaced forwardly directed linear edges substantially in the plane of said bottom linear edge, and a top screen cover likewise providing a forwardly directed linear edge in the plane of said bottom linear edge and said side linear edges, cooperating therewith to provide an opening, said rod member supporting said catcher from adjacent one of said edges of said side wall member, a U-clamp secured to the stem portion of said first U-member and a second rod member supported therefrom, said second rod member supporting said catcher from adjacent the other of said linear edges of said side walls, the spaced ends of said second U member being secured to said first U member by a pair of threaded means, one of said threaded means comprising an elongated rod member, and said grass catcher having a hook secured adjacent the trailing end thereof and supported from said rod member.

2. A rotary mower having a housing providing a trailing edge and having an opening positioned therein through which a stream of clippings is adapted to be discharged, said housing being provided with a pair of spaced upwardly directed lugs, a handle comprising a first U member having spaced ends secured to said upwardly directed ends, a second U member having spaced ends secured to the U portion of said first member, a bracket secured to one of said spaced ends of said first portion and connected to one corner of a basket having a forwardly directed opening, a U-clamp secured to the stem portion of said first U member and a second bracket supported therefrom, said second bracket supporting the other corner of the basket, the spaced ends of said second U member being secured to said first U member by threaded means, one of said threaded means comprising an elongated rod member for supporting the back of said basket.

References Cited in the file of this patent

UNITED STATES PATENTS

| | | |
|---|---|---|
| 1,032,180 | Boss | July 9, 1912 |
| 2,641,100 | Sylvester | June 9, 1953 |
| 2,737,003 | Beers | Mar. 6, 1956 |
| 2,747,356 | Peterson | May 29, 1956 |